United States Patent
Lee et al.

(10) Patent No.: US 6,231,781 B1
(45) Date of Patent: May 15, 2001

(54) REFRIGERANT MIXTURE COMPRISING DIFLUOROMETHANE AND 1,1,1-TRIFLUOROETHANE

(75) Inventors: Byung Gwon Lee, Seoul; Jong Sung Lim, Kyungki-Do; Young Soo Kwon, Seoul; Honggon Kim, Seoul; Dong Joo Mun, Seoul, all of (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/410,059

(22) Filed: Oct. 1, 1999

(30) Foreign Application Priority Data

Dec. 23, 1998 (KR) .................................................. 98-57665

(51) Int. Cl.$^7$ ...................................................... C09K 5/04

(52) U.S. Cl. ................................................ 252/67; 252/68

(58) Field of Search .......................................... 252/67–68

(56) References Cited

U.S. PATENT DOCUMENTS 4,961,321 * 10/1990 Oneill et al. .
5,438,849 * 8/1995 Yoshida et al. .
5,736,063 * 4/1998 Richard et al. .

* cited by examiner

*Primary Examiner*—Margaret Einsmann
(74) *Attorney, Agent, or Firm*—Arent Fox Kintner Plotkin & Kahn, PLLC

(57) ABSTRACT

A refrigerant composition useful as a substitute for chlorodifluoromethane ($CHClF_2$, HCFC-22). The refrigerant composition has a first constituent of difluoromethane ($CH_2F_2$, HFC-32); a second constituent of 1,1,1-trifluoroethane ($CH_3CF_3$; namely, HFC-143a); and a third constituent selected from cyclopropane ($C_3H_6$, RC-270), 1,1,1,2,3,3,3-heptafluoropropane ($CF_3CHFCF_3$, HFC-227ea), 1,1,1,2,2-pentafluoropropane ($CH_3CF_2CF_3$, HFC-245cb), 1,1,1,2,3,3-hexafluoropropane ($CHF_2CHFCF_3$, HFC-236ea), butane ($C_4H_{10}$, R-600), bis(difluoromethyl) ether ($CHF_2OCHF_2$, HFE-134) and pentafluoroethylmethylether ($CF_3CF_2OCH_3$, HFE-245).

9 Claims, No Drawings

REFRIGERANT MIXTURE COMPRISING DIFLUOROMETHANE AND 1,1,1-TRIFLUOROETHANE

BACKGROUND OF THE INVENTION

1. Field of the Invention

The present invention relates to a refrigerant mixture which is useful as a substitute for chlorodifluoromethane ($CHClF_2$, HCFC-22). More particularly, the present invention relates to a refrigerant mixture which is useful as a substitute for HCFC-22, which comprises a first constituent of difluoromethane ($CH_2F_2$, HFC-32); a second constituent of 1,1,1-trifluoroethane ($CH_3CF_3$, HFC-143a); and a third constituent selected from the group consisting of cyclopropane ($C_3H_6$, RC-270), 1,1,1,2,3,3,3-heptafluoropropane ($CF_3CHFCF_3$, HFC-227ea), 1,1,1,2,2-pentafluoropropane ($CH_3CF_2CF_3$, HFC-245cb), 1,1,1,2,3,3-hexafluoropropane ($CHF_2CHFCF_3$, HFC-236ea), butane ($C_4H_{10}$, R-600), bis(difluoromethyl)ether ($CHF_2OCHF_2$, HFE-134) and pentafluoroethylmethylether ($CF_3CF_2OCH_3$, HFE-245).

2. Description of the Prior Art

As it is well known, CFC compounds have been restricted in production and use in accordance with the Montreal Protocol because they have been found as a main factor in contributing to the destruction of the ozone layer. In advanced nations, the use of such CFC compounds has already been banned since 1996. It is also known that HCFC-based compounds such as HCFC-22 have considerable effects in causing damage to the ozone layer even though this effect is less severe than those of the CFC compounds. For this reason, a restriction has been made to gradually reduce the use of such HCFC-based compounds. A plan has also been made to ban the use of HCFC-based compounds about the year 2020.

This has resulted in a number of world-wide research efforts to produce substitute materials coping with the restriction in use of HCFC-22 which will be more severe in the future. The representative examples of a substitute refrigerant mixtures are HFC-407C and HFC-410A proposed by the American Society of Heating, Refrigerating and Air-Conditioning Engineers (ASHRAE). HFC-407C is a refrigerant mixture of HFC-32/125/134a in a ratio of 23/25/52 (based on weight percent). Meanwhile, HFC-410A is a refrigerant mixture of HFC-32/125 in a ratio of 50/50 (based on weight percent).

In addition, U.S. Pat. No. 5,080,823 discloses a mixed refrigerant composition of HFC-143a/propane ($C_3H_8$), U.S. Pat. No. 5,185,094: HFC-32/125/134a, U.S. Pat. No. 5,211,867: HFC-125/143a, U.S. Pat. No. 5,234,613: HFC-32/propane, U.S. Pat. No. 5,236,611: PFC-218/HFC-143a, U.S. Pat. No. 5,290,466: HFC-32/134a/134, U.S. Pat. No. 5,340,490: HFC-23/$CO_2$ or HFC-23/116/$CO_2$, U.S. Pat. No. 5,403,504: HFC-125/32, U.S. Pat. No. 5,429,760: HFC-23/134a, U.S. Pat. No. 5,538,660: HFC-32/HFC-134a/FC-14 or HFC-32/HFC-134a/PFC-218, and U.S. Pat. No. 5,643,492: HFC-32/125/134a.

Also, Japanese Patent Laid-open Publication No. 172386/1991 discloses a mixed refrigerant composition of HFC-32/125/152, Japanese Patent Laid-open Publication No. 170594/1991: HFC-23/125/134a, Japanese Patent Laid-open Publication No. 170592/1991: HFC-32/143a/152a, Japanese Patent Laid-open Publication No. 170593/1991: HFC-23/125/32, Japanese Patent Laid-open Publication No. 170591/1991: HFC-23/143a/134a, Japanese Patent Laid-open Publication No. 170590/1991: HFC-125/134a/32, Japanese Patent Laid-open Publication No. 170589/1991: HFC-23/143a/152a, Japanese Patent Laid-open Publication No. 170588/1991: HFC-125/143a/134a, Japanese Patent Laid-open Publication No. 170587/1991: HFC-32/134a/152a, Japanese Patent Laid-open Publication No. 170586/1991: HFC-32/143a/134a, Japanese Patent Laid-open Publication No. 170585/1991: HFC-32/125/134a, Japanese Patent Laid-open Publication No. 170584/1991: HFC-23/134a/152a, Japanese Patent Laid-open Publication No. 170583/1991: HFC-125/143a/32, Japanese Patent Laid-open Publication No. 222893/1992: HFC-32/125, Japanese Patent Laid-open Publication No. 154887/1992: HFC-134/152a, Japanese Patent Laid-open Publication No. 117645/1993: HFC-23/134a/propane, Japanese Patent Laid-open Publication No. 117643/1993: HFC-125/134a/propane, Japanese Patent Laid-open Publication No. 65561/1994: HFC-23/152a/PFC-218, Japanese Patent Laid-open Publication No. 128872/1994: HFC-32/PFC-218, Japanese Patent Laid-open Publication No. 220433/1994: HFC-32/125/RC-318, Japanese Patent Laid-open Publication No. 173462/1995: HFC-143a/125/134a/heptane ($C_7H_{16}$), Japanese Patent Laid-open Publication No. 176537/1996: PFC-218/RC-270/HFC-152a, Japanese Patent Laid-open Publication No. 151569/1996: propane/RC-270/HFC-134a, Japanese Patent Laid-open Publication No. 127767/1996: HFC-32/134a/RC-318, Japanese Patent Laid-open Publication No. 25480/1997: HFC-32/134a/125/isobutane, Japanese Patent Laid-open Publication No. 59611/1997: HFC-134a/isobutane, Japanese Patent Laid-open Publication No. 208941/1997: HFC-32/152a/125/RC-270, and Japanese Patent Laid-open Publication No. 221664/1997: HFC-125/143a/134a/RC-270.

Also, Korean Patent Publication No. 93-10514 (Application No. 90-19594) discloses a mixed refrigerant composition of HFC-23/32/152a, HFC-23/125/152a, HFC-32/143a/152a, HFC-125/143a/152a, HFC-32/125/125a, HFC-23/143a/152a, or HFC-23/125/152a, Korean Patent Publication No. 93-10515 (Application No. 90-19596) HFC- 23/32/134, HFC-23/32/134a, HFC-23/125/134a, HFC-23/125/134, HFC-32/125/134, HFC-23/143a/134a, HFC-32/143a/134a, HFC-32/125/134a, HFC-125/143a/134a, or HFC-125/143a/134, Korean Patent Laid-open Publication No. 96-4485 (Application No. 95-21221) HFC-32/23/134a, Korean Patent Laid-open Publication No. 95-704438 (Application No. 95-701865) HFC-32/23/134a, Korean Patent Laid-open Publication No. 96-701168 (Application No. 95-704038) HFC-227ea/HFC-152a, and Korean Patent Laid-open Publication No. 97-704853 (Application No. 97-700436) HFC-134a/HCFC-124/butane.

SUMMARY OF THE INVENTION

Therefore, an object of the present invention is to provide a novel refrigerant mixture which is useful as a substitute for HCFC-22. That is, the present invention has an object to provide a refrigerant composition produced by mixing any one of RC-270, HFC-227ea, HFC-245cb, HFC-236ea, R-600, HFE-134, and HFE-245 with a mixture of HFC-32 and HFC-143a, thereby producing a composition capable of exhibiting properties similar to HCFC-22.

DESCRIPTION OF THE PREFERRED EMBODIMENTS

The present invention provides a refrigerant composition which is useful as a substitute for HCFC-22, comprising a first constituent of difluoromethane ($CH_2F_2$, HFC-32); a second constituent of 1,1,1-trifluoroethane ($CH_3CF_3$; namely, HFC-143a); and a third constituent selected from the group consisting of cyclopropane ($C_3H_6$, RC-270), 1,1,1,2,3,3,3-heptafluoropropane ($CF_3CHFCF_3$, HFC-227ea), 1,1,1,2,2-pentafluoropropane ($CH_3CF_2CF_3$, HFC-245cb), 1,1,1,2,3,3-hexafluoropropane ($CHF_2CHFCF_3$, HFC-236ea), butane ($C_4H_{10}$, R-600), bis(difluoromethyl)ether ($CHF_2OCHF_2$, HFE-134) and pentafluoroethylmethylether ($CF_3CF_2OCH_3$, HFE-245).

It is preferred that the refrigerant composition of the present invention comprises a first constituent of 10 to 70% by weight difluoromethane ($CH_2F_2$, HFC-32); a second constituent of 10 to 80% by weight 1,1,1-trifluoroethane ($CH_3CF_3$; namely, HFC-143a); and a third constituent of 0 to 50% by weight comprising one selected from the group consisting of cyclopropane ($C_3H_6$, RC-270), 1,1,1,2,3,3,3-heptafluoropropane ($CF_3CHFCF_3$, HFC-227ea), 1,1,1,2,2-pentafluoropropane ($CH_3CF_2CF_3$, HFC-245cb), 1,1,1,2,3,3-hexafluoropropane ($CHF_2CHFCF_3$, HFC-236ea), butane ($C_4H_{10}$, R-600), bis(difluoromethyl)ether ($CHF_2OCHF_2$, HFE-134) and pentafluoroethylmethylether ($CF_3CF_2OCH_3$, HFE-245).

In accordance with the present invention, the refrigerant composition as mentioned above is applied to a refrigeration system which comprises a compressor, a condenser, an expansion valve, and an evaporator in order to evaluate the coefficient of performance (COP), value of calorie per volume of refrigerant (VC), and pressures in the compressor and evaporator. The novel refrigerant mixture according to the present invention is evaluated to be substantially equivalent to HFC-407C or HFC-410A in terms of performance. Accordingly, the refrigerant mixture of the present invention is useful as a substitute for HCFC-22.

Where the refrigerant mixture of the present invention includes HFC-32, HFC-143a, and RC-270, the composition comprises 10 to 50% by weight of HFC-32, 20 to 80% by weight of HFC-143a, and 0 to 40% by weight of RC-270. More preferably, the composition comprises 20 to 50% by weight of HFC-32, 30 to 70% by weight of HFC-143a, and 0 to 30% by weight of RC-270.

Where the refrigerant mixture of the present invention includes HFC-32, HFC-143a, and HFC-227ea, its composition comprises 20 to 80% by weight of HFC-32, 0 to 80% by weight of HFC-143a, and 0 to 60% by weight of HFC-227ea. Preferably, the composition comprises 30 to 70% by weight of HFC-32, 10 to 70% by weight of HFC-143a, and 0 to 45% by weight of HFC-227ea.

Where the refrigerant mixture of the present invention includes HFC-32, HFC-143a, and HFC-245cb, it is preferable that the refrigerant mixture has a composition comprises 20 to 70% by weight of HFC-32, 10 to 80% by weight of HFC-143a, and 0 to 40% by weight of HFC-245cb.

Where the refrigerant mixture of the present invention includes HFC-32, HFC-143a, and HFC-236ea, its composition comprises 20 to 70% by weight of HFC-32, 10 to 80% by weight of HFC-143a, and 0 to 30% by weight of HFC-236ea. Preferably, the composition comprises 30 to 60% by weight of HFC-32, 20 to 70% by weight of HFC-143a, and 0 to 20% by weight of HFC-236ea.

Where the refrigerant mixture of the present invention includes HFC-32, HFC-143a, and R-600, its composition comprises 20 to 60% by weight of HFC-32, 30 to 80% by weight of HFC-143a, and 0 to 20% by weight of R-600. Preferably, the composition comprises 30 to 50% by weight of HFC-32, 38 to 70% by weight of HFC-143a, and 0 to 12% by weight of R-600.

Where the refrigerant mixture of the present invention includes HFC-32, HFC-143a, and HFE-134, its composition comprises 20 to 70% by weight of HFC-32, 20 to 80% by weight of HFC-143a, and 0 to 15% by weight of HFE-134. More preferably, the composition comprises 30 to 60% by weight of HFC-32, 32 to 70% by weight of HFC-143a, and 0 to 8% by weight of HFE-134.

Where the refrigerant mixture of the present invention includes HFC-32, HFC-143a, and HFE-245, its composition comprises 20 to 80% by weight of HFC-32, 10 to 80% by weight of HFC-143a, and 0 to 20% by weight of HFE-245. More preferably, the composition comprises 30 to 70% by weight of HFC-32, 20 to 70% by weight of HFC-143a, and 0 to 10% by weight of HFE-245.

The present invention will be explained in more detail in the following examples. It is to be understood that these examples are merely illustrative and it is not intended to limit the scope of the present invention to these examples.

EXAMPLE

Evaluation of Performance of Refrigerant Mixture

In order to evaluate the performance of the refrigerant mixture according to the present invention, a refrigeration system including a compressor, a condenser, an expansion valve, and an evaporator was used which has the following performance evaluation conditions:

Refrigeration Capacity: 2 kW

Coefficient of Overall Heat Transfer coefficient in Evaporator (UA): 0.20 kW/K

Coefficient of Overall Heat Transfer coefficient in Condenser (UA): 0.24 kW/K

Degree of Subcooling in Condenser: 5° C.

Degree of Superheating in Evaporator: 5° C.

Efficiency of Compressor: 0.8

Temperature of Secondary Fluid at Inlet of Condenser: 25° C.

Temperature of Secondary Fluid at Outlet of Condenser: 35° C.

Temperature of Secondary Fluid at Inlet of Evaporator: 15° C.

Temperature of Secondary Fluid at Outlet of Evaporator: 5° C.

Under the above conditions, the refrigerant mixtures according to the present invention were compared to HCFC-22, HFC-407C, and HFC-410A in terms of the main factors for evaluating refrigerant performance, that is, the coefficient of performance (COP), value of calorie per volume of refrigerant (VC), and evaporator pressure ($P_L$), and condenser pressure ($P_H$).

Comparative Examples 1 to 3

HCFC-22, HFC-407C, and HFC-410A compared to the refrigerant compositions of the present invention have the following evaluated performances:

TABLE 1

Evaluated Performance of HCFC-22, HFC-407C, and HFC-410A

| Comparative Example No. | Refrigerant | HCFC-22 (wt. %) | HFC-32 (wt. %) | HFC-125 (wt. %) | HFC-134a (wt. %) | COP | VC (kJ/m³) | $P_L$ (kPa) | $P_H$ (kPa) |
|---|---|---|---|---|---|---|---|---|---|
| 1 | HCFC-22 | 100 | — | — | — | 5.45 | 3338 | 455 | 1254 |
| 2 | HFC-407C | — | 23 | 25 | 52 | 4.98 | 3412 | 460 | 1445 |
| 3 | HFC-410A | — | 50 | 50 | — | 5.31 | 5117 | 730 | 1993 |

Referring to Table 1, it can be seen that HFC-407C exhibits a COP slightly less than that of HCFC-22 while exhibiting a VC and pressures similar to those of HCFC-22. On the other hand, HFC-410A has a COP similar to that of HCFC-22 while exhibiting pressures slightly higher than those of HCFC-22. It should be noted that a composition exhibiting a refrigerant performance defined as above is useful as a substitute refrigerant for HCFC-22. Accordingly, the performances of the refrigerant mixtures according to the present invention were evaluated and compared with the above evaluated results.

Example 1

Evaluation of Performance of Refrigerant Mixture of HFC-32/HFC-143a/RC-270

The evaluated performances of the refrigerant mixture comprising HFC-32/HFC-143a/RC-270 at different weight percent of each components are described in Table 2, respectively. Referring to Table 2, it can be found that the performance of the compositions indicated in each item of Table 2 fall within the ranges between those of HFC-407C and HFC-410A, so that the tested refrigerant mixture is useful as a substitute for HCFC-22.

TABLE 2

Evaluated Performance of Refrigerant Mixture of HFC-32/HFC-143a/RC-270

| Composition No. | HFC-32 (wt. %) | HFC-143a (wt. %) | RC-270 (wt. %) | COP | VC (kJ/m³) | $P_L$ (kPa) | $P_H$ (kPa) |
|---|---|---|---|---|---|---|---|
| 1 | 20 | 60 | 20 | 4.98 | 4495 | 712 | 1893 |
| 2 | 40 | 30 | 30 | 5.00 | 4830 | 747 | 1992 |
| 3 | 35 | 35 | 30 | 4.98 | 4715 | 732 | 1959 |
| 4 | 30 | 50 | 20 | 5.06 | 4772 | 747 | 1967 |
| 5 | 25 | 65 | 10 | 5.03 | 4596 | 716 | 1917 |
| 6 | 30 | 70 | 0 | 5.11 | 4475 | 669 | 1831 |

Example 2

Evaluation of Performance of Refrigerant Mixture of HFC-32/HFC-143a/HFC-227ea

The evaluated performances of the refrigerant mixture comprising HFC-32/HFC- 43a/HFC-227ea at different weight percent of each components are described in Table 3, respectively. Referring to Table 3, it can be found that the performance of the compositions indicated in each item of Table 3 fall within the ranges between those of HFC-407C and HFC-410A, so that the tested refrigerant mixture is useful as a substitute for HCFC-22.

TABLE 3

Evaluated Performance of Refrigerant Mixture of HFC-32/HFC-143a/HFC-227ea

| Composition No. | HFC-32 (wt. %) | HFC-143a (wt. %) | HFC-227ea (wt. %) | COP | VC (kJ/m³) | $P_L$ (kPa) | $P_H$ (kPa) |
|---|---|---|---|---|---|---|---|
| 1 | 40 | 40 | 20 | 5.15 | 4552 | 662 | 1844 |
| 2 | 35 | 35 | 30 | 5.01 | 4279 | 622 | 1797 |
| 3 | 40 | 20 | 40 | 4.99 | 4297 | 616 | 1810 |
| 4 | 60 | 20 | 20 | 5.39 | 5051 | 715 | 1927 |
| 5 | 70 | 10 | 20 | 5.46 | 5243 | 734 | 1962 |
| 6 | 45 | 10 | 45 | 5.00 | 4383 | 623 | 1838 |
| 7 | 30 | 50 | 20 | 5.02 | 4259 | 628 | 1786 |
| 8 | 30 | 60 | 10 | 5.08 | 4378 | 650 | 1809 |
| 9 | 30 | 70 | 0 | 5.11 | 4475 | 669 | 1831 |

Example 3

Evaluation of Performance of Refrigerant Mixture of HFC-32/HFC-143a/HFC-245cb

The evaluated performances of the refrigerant mixture comprising HFC-32/HFC-143a/HFC-245cb at different weight percent of each components are described in Table 4, respectively. Referring to Table 4, it can be found that the performance of the compositions indicated in each item of Table 4 fall within the ranges between those of HFC-407C and HFC-410A, so that the tested refrigerant mixture is useful as a substitute for HCFC-22.

TABLE 4

Evaluated Performance of Refrigerant Mixture of HFC-32/HFC-143a/HFC-245cb

| Composition No. | HFC-32 (wt. %) | HFC-143a (wt. %) | HFC-245cb (wt. %) | COP | VC (kJ/m³) | $P_L$ (kPa) | $P_H$ (kPa) |
|---|---|---|---|---|---|---|---|
| 1 | 40 | 40 | 20 | 5.10 | 4336 | 623 | 1772 |
| 2 | 40 | 50 | 10 | 5.18 | 4535 | 658 | 1819 |
| 3 | 40 | 55 | 5 | 5.20 | 4622 | 675 | 1848 |
| 4 | 40 | 30 | 30 | 5.01 | 4129 | 586 | 1722 |
| 5 | 60 | 20 | 20 | 5.30 | 4780 | 669 | 1850 |
| 6 | 30 | 60 | 10 | 5.05 | 4281 | 632 | 1775 |
| 7 | 50 | 20 | 30 | 5.13 | 4377 | 613 | 1770 |
| 8 | 30 | 70 | 0 | 5.11 | 4425 | 669 | 1831 |

Example 4

Evaluation of Performance of Refrigerant Mixture of HFC-32/HFC-143a/HFC-236ea

The evaluated performances of the refrigerant mixture comprising HFC-32/HFC-143a/HFC-236ea at different weight percent of each components are described in Table 5, respectively. Referring to Table 5, it can be found that the performance of the compositions indicated in each item of Table 5 fall within the ranges between those of HFC-407C and HFC-410A, so that the tested refrigerant mixture is useful as a substitute for HCFC-22.

TABLE 5

Evaluated Performance of Refrigerant Mixture of HFC-32/HFC-143a/HFC-236ea

| Composition No. | HFC-32 (wt. %) | HFC-143a (wt. %) | HFC-236ea (wt. %) | COP | VC (kJ/m$^3$) | $P_L$ (kPa) | $P_H$ (kPa) |
|---|---|---|---|---|---|---|---|
| 1 | 30 | 60 | 10 | 4.99 | 4205 | 618 | 1765 |
| 2 | 60 | 30 | 10 | 5.32 | 4931 | 697 | 1899 |
| 3 | 60 | 20 | 20 | 5.02 | 4556 | 638 | 1858 |
| 4 | 40 | 50 | 10 | 5.11 | 4474 | 648 | 1818 |
| 5 | 50 | 40 | 10 | 5.23 | 4717 | 675 | 1861 |
| 6 | 30 | 70 | 0 | 5.11 | 4425 | 669 | 1831 |

Example 5

Evaluation of Performance of Refrigerant Mixture of HFC-32/HFC-143a/R-600

The evaluated performances of the refrigerant mixture comprisng HFC-32/HFC-143a/R-600 at different weight percent of each components are described in Table 6, respectively. Referring to Table 6, it can be found that the performance of the compositions indicated in each item of Table 6 fall within the ranges between those of HFC-407C and HFC-410A, so that the tested refrigerant mixture is useful as a substitute for HCFC-22.

TABLE 6

Evaluated Performance of Refrigerant Mixture of HFC-32/HFC-143a/R-600

| Composition No. | HFC-32 (wt. %) | HFC-143a (wt. %) | R-600 (wt. %) | COP | VC (kJ/m$^3$) | $P_L$ (kPa) | $P_H$ (kPa) |
|---|---|---|---|---|---|---|---|
| 1 | 45 | 45 | 10 | 5.10 | 4611 | 687 | 1883 |
| 2 | 50 | 40 | 10 | 5.15 | 4740 | 702 | 1909 |
| 3 | 50 | 38 | 12 | 4.98 | 4551 | 676 | 1894 |
| 4 | 55 | 40 | 5 | 5.31 | 5007 | 731 | 1946 |
| 5 | 40 | 55 | 5 | 5.19 | 4673 | 696 | 1876 |
| 6 | 35 | 60 | 5 | 5.13 | 4545 | 682 | 1854 |
| 7 | 30 | 70 | 0 | 5.11 | 4425 | 669 | 1831 |

Example 6

Evaluation of Performance of Refrigerant Mixture of HFC-32/HFC-143a/HFE-134

The evaluated performances of the refrigerant mixture comprisng HFC-32/HFC-143a/HFE-134 at different weight percent of each components are described in Table 7, respectively. Referring to Table 7, it can be found that the performance of the compositions indicated in each item of Table 7 fall within the ranges between those of HFC-407C and HFC-410A, so that the tested refrigerant mixture is useful as a substitute for HCFC-22.

TABLE 7

Evaluated Performance of Refrigerant Mixture of HFC-32/HFC-143a/HFE-134

| Composition No. | HFC-32 (wt. %) | HFC-143a (wt. %) | HFE-134 (wt. %) | COP | FC (kJ/m$^3$) | $P_L$ (kPa) | $P_H$ (kPa) |
|---|---|---|---|---|---|---|---|
| 1 | 48 | 48 | 4 | 5.13 | 4574 | 654 | 1833 |
| 2 | 45 | 50 | 5 | 5.05 | 4438 | 635 | 1813 |
| 3 | 40 | 55 | 5 | 5.01 | 4341 | 625 | 1792 |
| 4 | 50 | 45 | 5 | 5.09 | 4535 | 645 | 1829 |
| 5 | 50 | 43 | 7 | 4.99 | 4388 | 619 | 1803 |
| 6 | 55 | 40 | 5 | 5.14 | 4623 | 653 | 1840 |
| 7 | 60 | 35 | 5 | 5.16 | 4702 | 660 | 1856 |
| 8 | 60 | 32 | 8 | 5.00 | 4479 | 624 | 1824 |
| 9 | 35 | 60 | 5 | 4.99 | 4240 | 614 | 1763 |
| 10 | 30 | 70 | 0 | 5.11 | 4425 | 669 | 1831 |

Example 7

Evaluation of Performance of Refrigerant Mixture of HFC-32/HFC-143a/HFE-245

The evaluated performances of the refrigerant mixture comprisng HFC-32/HFC-143a/HFE-245 at different weight percent of each components are described in Table 8, respectively. Referring to Table 8, it can be found that the performance of the compositions indicated in each item of Table 8 fall within the ranges between those of HFC-407C and HFC-410A, so that the tested refrigerant mixture is useful as a substitute for HCFC-22.

TABLE 8

Evaluated Performance of Refrigerant Mixture of HFC-32/HFC-143a/HFE-245

| Composition No. | HFC-32 (wt. %) | HFC-143a (wt. %) | HFE-245 (wt. %) | COP | VC (kJ/m$^3$) | $P_L$ (kPa) | $P_H$ (kPa) |
|---|---|---|---|---|---|---|---|
| 1 | 70 | 20 | 10 | 5.03 | 4685 | 656 | 1890 |
| 2 | 65 | 25 | 10 | 4.98 | 4582 | 645 | 1874 |
| 3 | 60 | 35 | 5 | 5.35 | 4973 | 705 | 1902 |
| 4 | 50 | 45 | 5 | 5.22 | 4759 | 685 | 1878 |
| 5 | 40 | 55 | 5 | 5.13 | 4526 | 660 | 1833 |
| 6 | 30 | 65 | 5 | 4.99 | 4262 | 630 | 1784 |
| 7 | 30 | 70 | 0 | 5.11 | 4425 | 669 | 1831 |

As apparent from the above description, the present invention provides a refrigerant composition, which is useful as a substitute for HCFC-22, produced by mixing any one of RC-270, HFC-227ea, HFC-245cb, HFC-236ea, R-600, HFE-134 and PFC-245 with a mixture of HFC-32 and HFC-143a. The refrigerant composition according to the present invention has an advantage in that it does not damage the ozone layer, so there is no possibility of being restricted in use in the future. The above materials, which are components of the refrigerant composition according to the present invention, are currently commercially available, or active research for those materials is being conducted to make them commercially available in the future. Although the present embodiment of the present invention have been disclosed for illustrative purpose, those skilled in the art will appreciate that various modification, additions and substitutions are possible, without departing from the scope and spirit of the invention as recited in the accompanying claims.

What is claimed is:

1. A refrigerant composition useful as a substitute for chlorodifluoromethane, comprising:
   a first constituent of difluoromethane;
   a second constituent of 1,1,1-trifluoroethane; and,
   a third constituent selected from the group consisting of cyclopropane, 1,1,1,2,3,3,3-heptafluoropropane, 1,1,1,2,2-pentafluoropropane, 1,1,1,2,3,3-hexafluoropropane, butane, bis(difluoromethyl)ether and pentafluoroethylmethylether.

2. The refrigerant composition as claimed in claim 1, wherein the first constituent is 10 to 70% by weight, the second constituent is 10 to 80% by weight, and the third constituent is present in an amount up to 50% by weight.

3. A refrigerant composition useful as a substitute for chlorodifluoromethane, comprising:
   20 to 40% by weight of difluoromethane,
   30 to 70% by weight of 1,1,1-trifluoroethane, and, an amount up to 30% by weight of cyclopropane.

4. A refrigerant composition useful as a substitute for chlorodifluoromethane, comprising:
   30 to 70% by weight of difluoromethane,
   10 to 70% by weight of 1,1,1-trifluoroethane, and,
   an amount up to 45% by weight of 1,1,1,3,3,3-heptafluoropropane.

5. A refrigerant composition useful as a substitute for chlorodifluoromethane, comprising:
   30 to 60% by weight of difluoromethane,
   20 to 70% by weight of 1,1,1-trifluoroethane, and,
   an amount up to 30% by weight of 1,1,1,2,2-pentafluoropropane.

6. A refrigerant composition useful as a substitute for chlorodifluoromethane, comprising:
   30 to 60% by weight of difluoromethane,
   20 to 70% by weight of 1,1,1-trifluoroethane, and
   an amount up to 20% by weight of 1,1,1,2,3,3-hexafluoropropane.

7. A refrigerant composition useful as a substitute for chlorodifluoromethane, comprising:
   30 to 50% by weight of difluoromethane,
   38 to 70% by weight of 1,1,1-trifluoroethane, and,
   an amount up to 12% by weight of butane.

8. A refrigerant composition useful as a substitute for chlorodifluoromethane, comprising:
   30 to 60% by weight of difluoromethane,
   32 to 70% by weight of 1,1,1-trifluoroethane, and,
   an amount up to 8% by weight of bis(difluoromethyl)ether.

9. A refrigerant composition useful as a substitute for chlorodifluoromethane, comprising:
   30 to 70% by weight of difluoromethane,
   20 to 70% by weight of 1,1,1-trifluoroethane, and,
   an amount up to 10% by weight of pentafluoroethylmethylether.

* * * * *